United States Patent [19]
Cotter et al.

[11] Patent Number: 5,831,752
[45] Date of Patent: Nov. 3, 1998

[54] OPTICAL PACKET PROCESSING

[75] Inventors: David Cotter, Woodbridge; Kevin Smith, Ipswich; Julian K. Lucek, Ipswich; David C. Rogers, Ipswich, all of United Kingdom

[73] Assignee: British Telecommunications public limited company, London, England

[21] Appl. No.: 737,914

[22] PCT Filed: May 23, 1995

[86] PCT No.: PCT/GB95/01175

§ 371 Date: Dec. 24, 1996

§ 102(e) Date: Dec. 24, 1996

[87] PCT Pub. No.: WO95/32568

PCT Pub. Date: Nov. 30, 1995

[30] Foreign Application Priority Data

| | | | |
|---|---|---|---|
| May 23, 1994 | [GB] | United Kingdom | 9410311 |
| Jun. 28, 1994 | [GB] | United Kingdom | 9412956 |
| Aug. 15, 1994 | [GB] | United Kingdom | 94306015 |
| Sep. 28, 1994 | [GB] | United Kingdom | 9419679 |
| Nov. 18, 1994 | [GB] | United Kingdom | 94308523 |
| Nov. 21, 1994 | [GB] | United Kingdom | 94308568 |

[51] Int. Cl.$^6$ .................................................. H04J 14/08
[52] U.S. Cl. ........................ 359/135; 370/500; 370/520; 375/354; 359/158
[58] Field of Search ........................... 359/135, 139–140, 359/158, 123; 370/500, 520; 375/354

[56] References Cited

U.S. PATENT DOCUMENTS

| | | | |
|---|---|---|---|
| 5,172,258 | 12/1992 | Verber | 389/138 |
| 5,457,559 | 10/1995 | Saito et al. | 359/135 |

FOREIGN PATENT DOCUMENTS

| | | |
|---|---|---|
| WO-A-93 22855 | 11/1993 | WIPO . |
| WO-A-94 21088 | 9/1994 | WIPO . |

OTHER PUBLICATIONS

Driessen, "Robust Frame Synchronisation Using Standard VLSI Synchronous Input/Output Devices" Electronics Letters, 27th Oct. 1988, vol. 24, No. 22. pp. 1381–1383.

Hermes et al., "LOCNET—an Experimental Broadband LAN With Optical Switching", *Optical Communication*, ECOC, '84, Tenth European Conference, Sep. 3–6, 1984, pp. 274–275.

*Primary Examiner*—Kinfe-Michael Negash
*Attorney, Agent, or Firm*—Nixon & Vanderhye P.C.

[57] ABSTRACT

A multi-bit packet carried on an optical network includes a marker pulse. A bit-rate clock for use in a bit-level operation on the packet is generated by replicating the marker pulse. The bit-level operation may comprise retiming, regeneration or demultiplexing. The marker pulse may be distinguished by a fixed, bit-asynchronous time relationship to the rest of the packet.

29 Claims, 6 Drawing Sheets

FIG.10
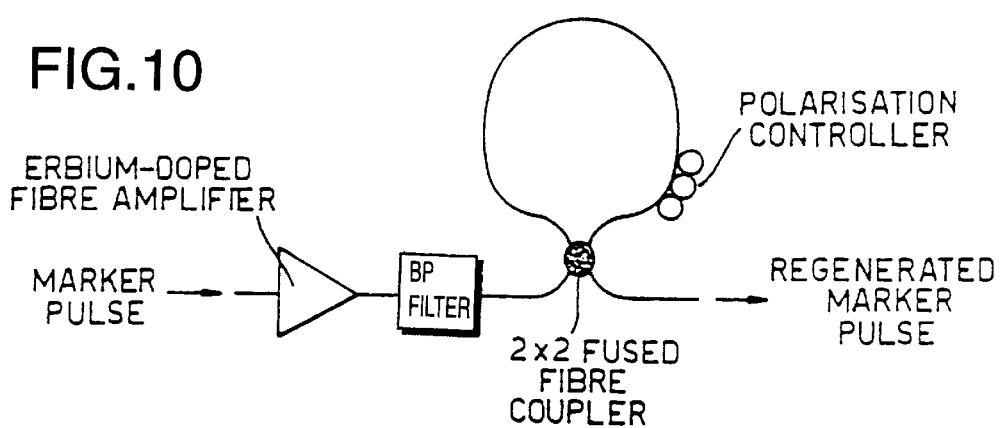
FIG.11
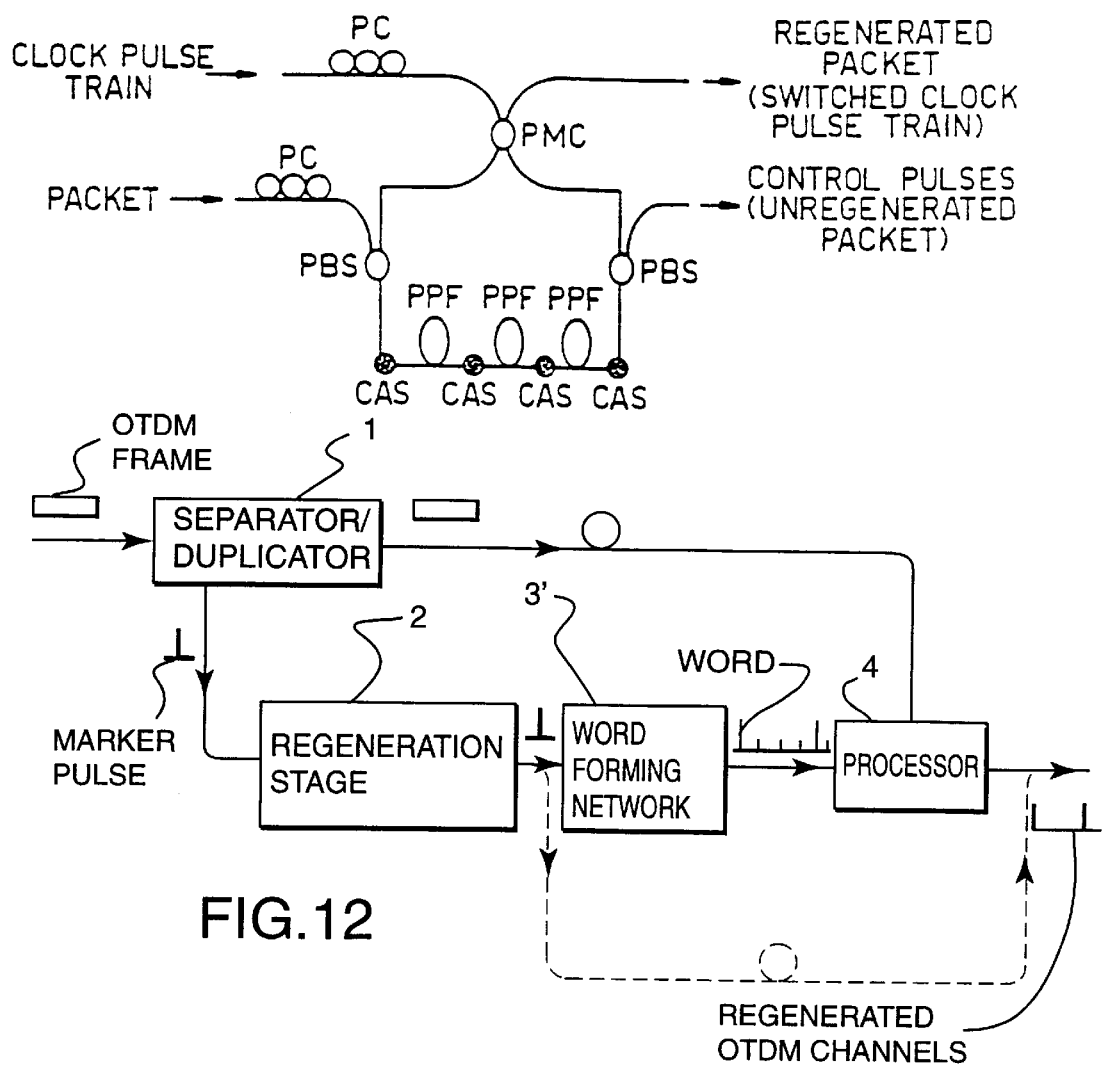
FIG.12

OPTICAL PACKET PROCESSING

BACKGROUND TO THE INVENTION

1. Field of the Invention

The present invention relates to a method and apparatus for processing a multi-bit packet carried on an optical network. Typically the package might comprise an ultrafast binary data signal having a bit rate of 10 Gbit/s or more and carrying e.g., telecommunications traffic.

2. Related Art

The term packet as used herein encompasses both asynchronous packets as transmitted, for example, in an ATM system, and packets of synchronous data, such as frames in a synchronous OTDM system.

Ultrafast binary data signals can be generated quite readily in return-to-zero (RZ) format by using a source of ultrashort e.g. (picosecond) pulses at a repetition frequency which is a sub-multiple of the required bit rate. These pulses are then each split into a number of separate optical paths, modulated using electro-optic devices, time-delayed and then recombined so as to interleave them to achieve an ultrafast bit rate [1]. Since this bit rate may be beyond the speed capability of electronics, any subsequent signal processing (such as retiming, regeneration or demultiplexing) must use all-optical technologies. This in turn in general will require the provision of an optical clock signal in precise (picosecond) bit synchronisation with the data.

Whilst in ultrafast circuit-switched or synchronous transmission systems, clock recovery can be carried out using phase-locked loops, this is not possible for asynchronous transmission systems and especially asynchronous packet-switched systems because clock recovery has to be performed on a packet-by-packet basis in a small fraction of the packet duration. This would require a phased-locked loop with an extremely short acquisition time (possibly as short as a few tens or hundreds of picoseconds). Even if the loop round-trip delay in an optical phase-lock loop could be reduced by making the optical path lengths very short by using e.g. some kind of integrated optical device, for the phase-lock loop, to work robustly it would still require a large number of signal pulses to acquire lock with sufficient phase-error signal quality and with sufficient lock-in range. The acquisition times would therefore still be much longer than the packet duration in a packet-switch system. Moreover even if locking could be achieved in time, the short acquisition time would then make the phase-locked loop more sensitive to disturbance by noise.

In view of these problems, it has previously been proposed [7] to transmit a comb of clock pulses before each data packet. Then at each position in the network where signal processing of the packet is to be performed, the comb of clock pulses is separated from the data using optical couplers, fast photodetectors, electronic sense circuitry and an optoelectronic space switch. However this approach has serious disadvantages. Firstly, the payload traffic capacity of the network is reduced by the additional overhead associated with the transmission of the comb of clock pulses. Although this might be minimised by transmitting only a relatively short segment of the clock comb there would nonetheless have to be a time guard band between the clock comb and data packet long enough to accommodate the time uncertainty in the sense circuitry and the commuting time of the optoelectronic switch. This guard band may need to be as long as 0.5–1 ns, equivalent to 50–100 bit periods at a data packet bit rate of 100 Gbit/s. A second disadvantage is that the clock comb, or segments of it, will be subject to the same transmission impairments as the data packet, suffering, for example, amplitude noise and timing jitter arising from effects such as amplifier noise and fibre acousto-optic effects [8, 9]. This would limit the uses to which the clock pulse train could be put.

Another proposal disclosed in Zhang et al., Electronics Letters, Vol. 29, no. 21, 14 Oct. 1993, pp 1871–1873, uses clock pulses transmitted on a separate wavelength channel from the OTDM packet. Since the clock pulses are at a different wavelength, their phase relationship to the frame varies as a result of dispersion over the transmission path.

A paper published in Journal of Lightwave Technology, vol. 11, no. 5/6, May 1993, pp 829–835 discloses a system in which a synchronous stream of bits is divided up into blocks and sub-blocks which incorporate timing bits in a predetermined pattern. By means of several stages of logic processing incorporating AND and OR gates a clock signal is recovered from the predetermined bit pattern.

SUMMARY OF THE INVENTION

According to a first aspect of the present invention, there is provided a method of processing a multi-bit packet carried on an optical network, characterised by transmitting with the packet a marker pulse, and replicating the marker pulse and thereby producing a clock signal at the bit-rate or a sub-multiple thereof for use in a subsequent operation on the packet.

The present invention takes a single pulse from each packet, the "marker pulse" and uses it to create a clock pulse train by replicating the marker with the appropriate pulse repetition frequency. Since no feedback loops are involved, the technique can be used on a packet-by-packet basis with minimal delay. By contrast with the prior art techniques, the network overhead is negligible small (typically around 1–3 additional bit periods per packet) and the clock is recovered without needing complex logic circuitry. Moreover, the clock pulse train is created with great precision and substantially no amplitude or timing jitter. The invention is particularly advantageous in the context of asynchronous systems, where, as noted above, there is a need for rapid acquisition of a clock for each incoming frame. However it also offers advantages over conventional clock recovery techniques for synchronous OTDM frames.

Preferably, the recovered clock signal is used for retiming the multi-bit packet.

As already noted, the clock signal produced using the method of the present invention is substantially free of jitter. It is therefore particularly suitable for use in packet bit retiming.

The step of retiming may include introducing the packet and the recovered clock pulse train into a nonlinear optical modulator, the cross-phase modulation of the packet and the clock pulse train retiming the bits of the packet when the packet is subsequently output onto a dispersive medium.

This preferred form of packet bit retiming adapts the soliton-shepherding technique disclosed in the present applicant's co-pending international patent application PCT/GB93/00863 (WO93/22855).

Alternatively or in addition the subsequent bit-level processing may include a stage of all-optical packet regeneration. Preferably the recovered clock pulse train is input to an optical switch and the switch is gated by the incoming packet data stream, thereby producing at the output of the switch a re-generated data stream. The optical switch may be, for example, a non-linear loop mirror (NOLM).

The method may include a stage of marker pulse regeneration in which the marker pulse from the packet is amplified or filtered or otherwise shaped prior to replication.

Preferably the marker pulse has a fixed bit-asynchronous time relationship to the other pulses of the packet. The marker pulse can then be separated by ANDing the packet header containing the marker pulse with a delayed version of the header, the delay being such that the marker pulse coincides at the AND gate with another pulse of the header.

Other alternative means of distinguishing the marker pulse from the rest of the data packet include the use of a distinctive intensity, or polarisation for the marker. Use of a distinguishing time relationship is generally preferred since these alternatives all suffer the potential disadvantage that the marker pulse may, as a result of dispersion and like effects over a long optical path, become separated from the other pulses of the packet. By contrast if the marker pulse is distinguished simply by its time position, then it will in general propagate in the same manner as the other pulses of the packet. However, if polarisation-mode dispersion is negligible, or if a soliton marker is used, then distinguishing the marker by its polarisation is acceptable.

According to a second aspect of the present invention, there is provided an optical circuit for processing a multi-bit packet carried on an optical network, characterised by a marker pulse replication stage arranged to generate from a marker pulse carried with the multi-bit packet a clock at the packet bit-rate or a sub-multiple thereof for use in a subsequent operation on the packet.

According to a third aspect of the present invention, there is provided a method of processing a multi-bit packet carried on an optical network characterised by transmitting with the packet a marker pulse , subsequently generating an optical word from the marker pulse carried with the packet, processing the packet with the optical word, and outputting the processed packet.

BRIEF DESCRIPTION OF THE DRAWINGS

The present invention will now be described in further detail, by way of example only, with reference to the accompanying drawings in which:

FIG. 10 shows a pulse regenerator for use in the circuits of FIGS. 1 and 2;

FIG. 11 shows an optical switch for use in the circuit of FIG. 2; and

FIG. 12 shows a circuit for regenerating selected channels of a synchronous OTDM packet.

DETAILED DESCRIPTION OF EXEMPLARY EMBODIMENTS

Description of Examples

Figure 2A:
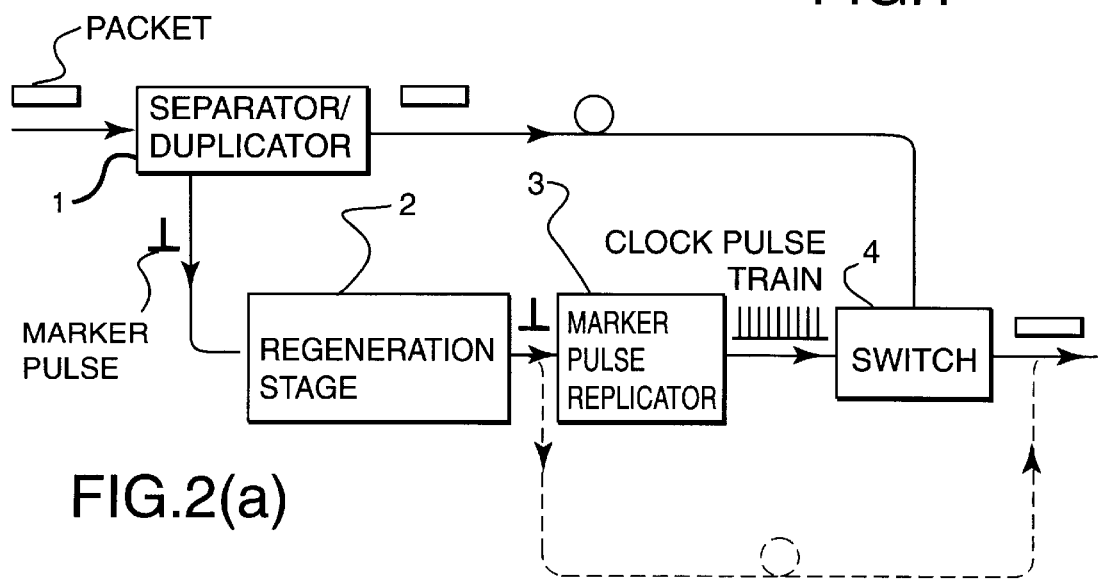
FIGS. 2a and 2b are an all-optical packet regenerator and an optical switch for use in such a regenerator respectively.
Figure 2B:
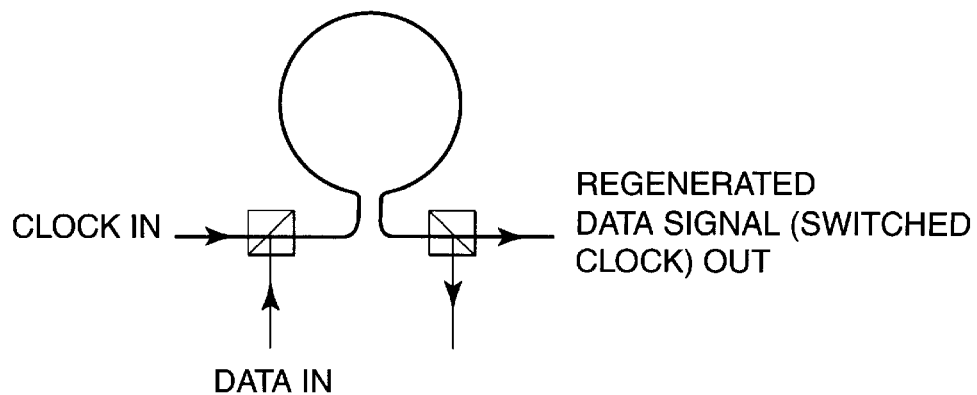

An all-optical packet regenerator includes a marker pulse separator/duplicator (1; FIG. 2) which receives at its input an incoming OTDM packet. The separator/duplicator 1 may replicate the packet using, for example, a fibre 50:50 coupler. The original packet is then output and passed on to a later switch stage, The packet present at the other output of the coupler is processed to recover and isolate a marker pulse carried in the packet header. The marker pulse then passes to a marker pulse regeneration stage 2 and onwards to a marker pulse replicator 3. This replicates the marker pulse using, for example, one of the techniques described in further detail below, to produce a clock pulse train at the packet bit rate. The clock pulse train is then input to an optical switch 4 gated by the original packet.

Figure 5A:
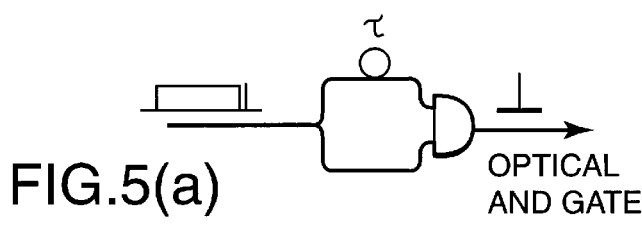
FIGS. 5a and 5b show methods of generating a clock pulse.

Although, as discussed in the introduction, a number of different methods are possible for distinguishing the marker pulse from the packet, the preferred technique adopted in the present examples uses a marker distinguished by its time position in relation to the rest of the data packet, and more particularly a marker which precedes the rest of the packet by a fixed bit-asynchronous delay. For example, the delay between the marker and the packet may be 1.5 T where T is the bit period of the packet. In this case, the packet may include in its header immediately following the marker pulse a bit which is always set to 1. The marker pulse can then be derived from the packet by applying the packet and a delayed version of the packet to an optical AND gate, with the delay being set equal to the distance in time between the marker and the first following bit of the packet, in the present example 1.5 T. This procedure is shown schematically in FIG. 5a.

Figure 5B:
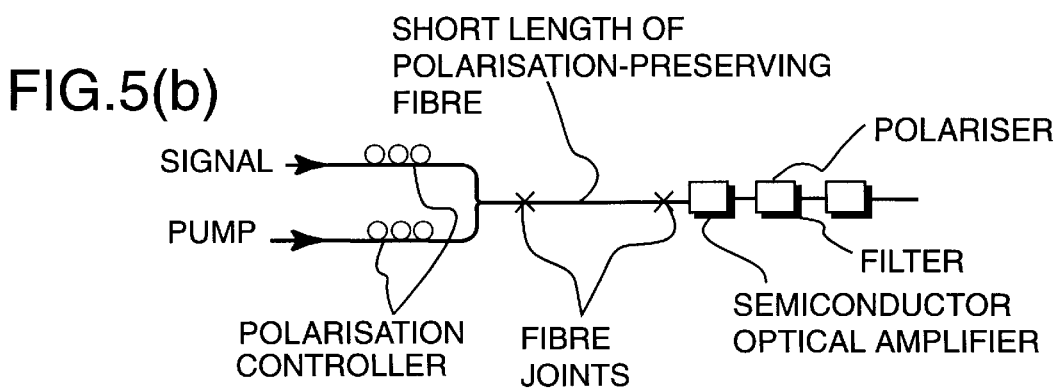

FIG. 5b shows a practical implementation. In this implementation the AND gate is a semiconductor laser amplifier. The original and delayed versions of the packet input to the AND gate interact in the SLA by a process of four wave mixing (FWM), as described in [16]. Independent polarisation controllers such as BT&D MPC1000 are provided in two input branches to the AND gate. The fixed delay is provided by a length of polarisation preserving fibre 54. The length of the fibre 54 is chosen so that group delay difference for the two polarisation eigenmodes of the fibre equals the required delay 1.5 T. For typical polarisation-preserving fibre, such as high-birefringence fibre type HB1500 manufactured by Fibercore Limited of Chandlers Ford, Hampshire, England, specified as having a beat length of less than 2 mm and with packets at a bit rate of 100 Gbit/s, the length required is less than 30 m, giving a delay of 15 ps. The polarisation state of the incoming packet is set to be linear, aligned at 45° to the fibre polarisation axis. This splits the signal into two orthogonally polarised components that emerge from the fibre with the required 15 ps time difference. These two orthogonally-polarised time-shifted components provide the input signals to the optical AND gate. As described in [16] the AND gate requires pump light which is coupled into the polarisation-preserving fibre through a second input branch with an appropriate polarisation.

It is found that with such an AND gate, sharp filtering is required on the output to separate the AND signal from other features of the output. This however can lead to an undesirable broadening in the output pulse profile. To avoid this, the output is preferably filtered using an ultra-steep edge high rejection fibre Bragg grating filter. Such a grating may be fabricated, for example, in hydrogen loaded (200 Bar) standard telecommunications fibre (Phillips matched-clad) with a nominal core-cladding index difference of $4.5 \times 10^{-3}$. A 4 mm long grating may be replicated using an interfermoneter based on a rectangular silica block and phase mask, as described in Kashyap R, "Photosensitive optical fibres:

Devices and Applications", Opt. Fibre Technol., 1(1), 17–34, 1994. One such filter can give extinctions greater than 64 dB and edge widths less than 1 nm, and two such filters cascaded with an interposed isolator can give better than 74 dB rejection.

Figure 4A:
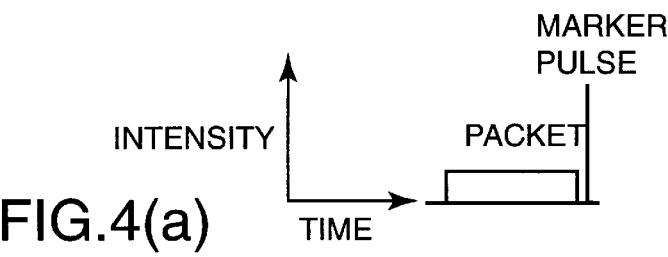
FIGS. 4a to 4c illustrate different methods of distinguishing the marker pulse.
Figure 4B:
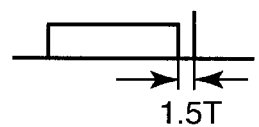
Figure 4C:

Other methods of distinguishing the marker pulse from the rest of the data packet include the use of a distinctive intensity, or polarisation as shown in FIGS. 4a, 4c respectively. FIG. 4b illustrates the preferred method, using time position.

Where the marker pulse is distinguished by its polarisation state, (FIG. 4c) for example if it has a polarisation orthogonal to the rest of the packet, then provided this orthogonality is preserved during transmission the marker can be stripped off from the main packet using a simple polarising beam splitter such as SIFAM type PS15. Experimental evidence suggests that polarisation orthogonality can be preserved over distances as great as thousands of kilometers. For transmission of the packet onwards from the node, a single orthogonally-polarised marker pulse must be replaced at the head of the packet. In FIG. 2 discussed above, and FIG. 1 discussed below, this is done using the dashed line optical path to route a replica of the marker pulse to be combined with the output packet with an appropriate time delay.

Once it has been recovered, the marker pulse is treated by the pulse regeneration stage. This may operate using e.g., amplification, spectral filtering, pulse compression or soliton shaping to improve the quality of the pulse. FIG. 10 shows one example of a marker pulse regenerator using nonlinear transmission characteristics of an optical device to improve the pulse quality, as described in "Pulse shaping, compression and pedestal suppression employing a nonlinear-loop mirror" K Smith et al., Optical Letters, vol 15 no. 22 pp 1294–1296 (1990). A NOLM is used to suppress the amplitude noise and background pedestal on a pulse and also to compress it in time. In the circuit shown in FIG. 10, the erbium fibre amplifier could be model EFA2000 available from BT&D Technologies. The bandpass filter could be the tunable device number TB15090B manufactured by JDS Fitel. The fused fibre coupler may be model no. SMC0202-9-2C50/212 and the polarisation controller could be a manual controller type MPC1000, both available from BT&D. The fibre used for the loop may be 200 m of dispersion-shifted fibre, dispersion zero at 1.6 microns wavelength, group velocity dispersion −1.6 ps/(nm-km) at 1.59 microns, as described in Smith et al.

As a further alternative, the pulse regeneration stage may include an optical source triggered by the incoming marker pulse to provide a newly generated output pulse.

Figure 6A:
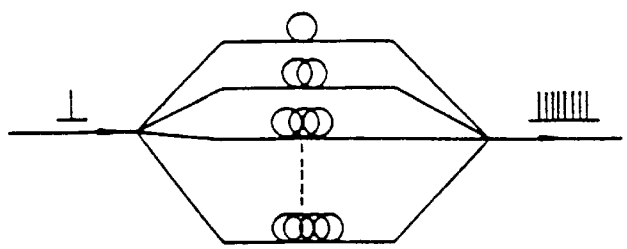
FIGS. 6a to 6c show alternative circuits for replicating the marker pulse.

The marker pulse replicator may use one of a number of different techniques for replicating the marker pulse to create a precise clock pulse train. FIG. 6a shows a single-stage split, delay and recombine network which can be fabricated using silica planar delay line technology [19]. However, while this is suitable for shorter clock pulse trains, if the pulse train is more than about 8 pulses long the single-stage network becomes unwieldy in construction. It is then preferable to use a concatenation of several binary split-delay-combine stages in shown in FIG. 6b. Using $\log_2 n$ stages a single input pulse is converted to a train of n pulses with constant pulse separation T. This arrangement has the advantage that the binary splitting and combining ratios can be chosen to be different from 50:50 to compensate for transmission loss asymmetry in each stage. Optical amplifiers such as erbium-doped fibre amplifiers JDS Fitel type ErFA-1000 may be inserted between stages as necessary to compensate for both intrinsic and extrinsic losses.

Figure 6B:
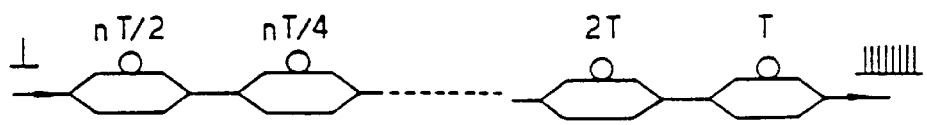
Figure 6C:
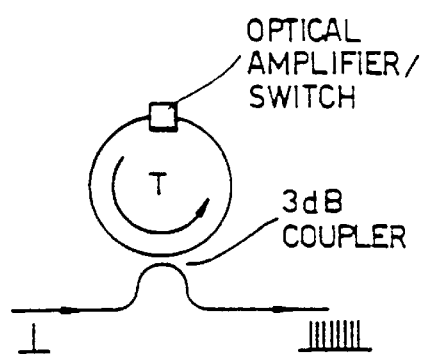

An alternative approach illustrated in FIG. 6c uses an amplified recirculating loop device to duplicate the input pulse. This comprises a short recirculating delay line with optical gain. A fraction of the marker pulse enters the loop through the coupler (C) and continues to circulate around the loop with gain being provided by the optical amplifier (A). The time delay associated with one round-trip of the loop is equal to the bit period of the packet or to an integer multiple thereof. A delay of 1 bit-period may be impractical at the highest bit rates. For example, if we are working with a bit rate of 100 Gbit/s, the required round trip time would be just 10 ps, implying a loop length of just 2 mm or less. It would be more practical in the case that we want to replicate the marker to create a pulse train at a sub-multiple of the bit rate. For example, if we replicate every tenth pulse of a 100 GHz clock (pulse repetition period=10 * 10 ps=100 ps) the required loop length would be about 15–20 mm (i.e. the loop diameter is approximately 6 mm). The actual loop length depends on the refractive index of the materials from which it is made. Supposing the loop consists of a silica planar delay line (e.g. ref [19]) together with a semiconductor optical amplifier device used as the amplifier/switch, then we require (L1*n1+L2*n2+L3)/c=T, where L1 is the path length of the silica planar delay line with refractive index n1, L2 is the path length of the semiconductor optical amplifier device with refractive index n2, L3 is the total path length in air of the interfaces between the silica planar delay lines and the semiconductor device, c is the speed of light in vacuum, and T is the required optical round-trip time. Then if, for example, T=100 ps, n1=1.5 (ref index of silica), n2=4 (typical semiconductor), L2=0.5 mm (typical semiconductor device length) and L3=0.5 mm, we require L1=18.17 mm. If we wanted to replicate the marker pulse so as to give a train of pulses at the full bit rate and as long as the packet (i.e. a train of perhaps several hundred pulses), it might be useful to combine the recirculating loop (FIG. 6c) with an earlier passive replication stage (FIG. 6a or 6b). For example, if we use a passive replication stage to create a train of e.g. 10 pulses at the full bit rate 100 Gbit/s, then the round-trip time of the recirculating loop could be chosen to be 10 times the bit period (i.e. 100 ps, as in the previous example). There would then be 10 pulses circulating continuously around the loop, providing a continuous train of 100 Gbit/s pulses at the output (continuous until the semiconductor amplifier/switch is turned off). The semiconductor optical amplifier switch could be, for example, BT&D type SOA 1100/3100.

In the ideal case, the coupler is a 3 dB coupler, and the amplifier gain is set to 3 dB gain. This results in a train of uniform intensity clock pulses which are half the intensity of the incoming marker. The amplifier is designed to be gateable electrically on a packet-by-packet basis. This requires a response time of say 1 ns or less, and for this purpose a semiconductor amplifier would be an appropriate device. This allows the replicator to be rapidly quenched ready for the next incoming packet.

The optical switch shown in FIG. 2 may be constructed as shown in FIG. 11. If the regeneration circuit of FIG. 10 is used, then the regenerated marker pulse is at the same wavelength as the incoming marker pulse. This means that the two inputs to the optical switch are at the same wavelength. A suitable optical switch that can operate with control and switched signals at the same wavelength is in the form of an nonlinear loop mirror (NOLM) as described in N A Whitaker et al. ("All optical arbitrary demultiplexing at 2.5 GBit/s with tolerance to timing jitter", Optical Letters vol 16 no 2:3 pp 1838–1840, December 1991) in which polarisation rather than wavelength distinguishes the signals. In the switch of FIG. 11:

PC=MPC1000

PMC=4-port polarisation-maintaining fibre coupler with 50:50 ratio, >15 dB extinction ratio and<1.5 dB excess insertion loss, available as a special component from JDS Fitel.

PBS=polarisation splitter/combiner type PB100-3N-15-NC from JDS Fitel.

PPF=polarisation-preserving fibre in three equal lengths;, total length 500 m.

CAS=crossed-axis fibre splice.

Figure 1:
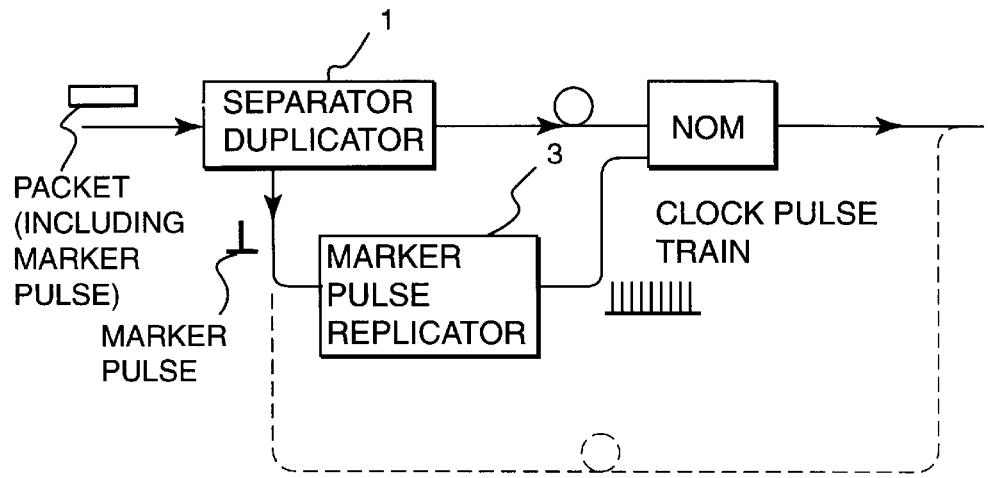
FIG. 1 is a schematic of a packet-bit retiming circuit.

FIG. 1 shows a packet bit retiming circuit using soliton shepherding. The basic technique of soliton shepherding is described and claimed in the present applicant's earlier International Application PCT/GB93/00863. By temporally overlapping a clock and soliton data stream in a non-linear optical medium (NOM) a non-linear phase profile $\Delta\Phi(T)$ is imposed upon the solitons by the clock pulses. Owing to the particle-like nature of the soliton, the imposed phase modulation is distributed over the whole pulse, resulting in a net shift in its carrier frequency. The sign and the magnitude of the frequency shift depend upon the position of the soliton relative to the clock pulse. If following this phase modulation the solitons are output on a medium having an appropriate dispersion (D), then the imposed frequency shift is converted into corresponding shifts in timing. Hence, the clock acts to shepherd the soliton towards the centre of the time slot defined by the clock pulse.

In the present example, the NOM is a length of optical fibre—the same fibre that is used in the transmission link. The non-linear process is that of cross-phase modulation (XPM). The shape of the imposed phase profile depends on (i) the width of the clock pulse, and (ii) the group delay difference between the signal and clock pulses; (walk-off). The XPM combined with the soliton-supporting dispersion (positive group delay dispersion) present within the transmission link both act to guide temporally the soliton bits. The build-up of amplifier noise during transmission may also be suppressed as a result of the interaction of the phase modulation and a spectral filter, in a manner similar to that described for FM laser mode-locking in A. E. Siegman, "Lasers" (Univ. Science Books, 1986) Chap. 27.

As in the optical regenerator described above, initially the marker pulse is separated from the packet. Although not shown in the example of FIG. 1, as in the previous embodiment pulse shaping may be applied to the recovered marker pulse. The marker pulse then passes to a replicator which generates a clock pulse train at the packet bit rate. Any of the techniques of replication described above with reference to the optical generator may also be used here. It is the bit rate clock pulse train produced by the replicator which provides the clock signal which is input to the NOM together with the soliton data stream to "shepherd" and thereby retime the individual bits of the data stream.

The optical fibre of the NOM may be polarisation preserving fibre. In this case, the two input pulse streams, the data stream and the clock pulse train, are launched into the fibre in orthogonal polarisation states using a polarising beam combiner/splitter.

As an alternative to the use of a fibre NOM other non-linear media may be used. In particular, a travelling wave semiconductor laser amplifier may be used.

Figure 3:
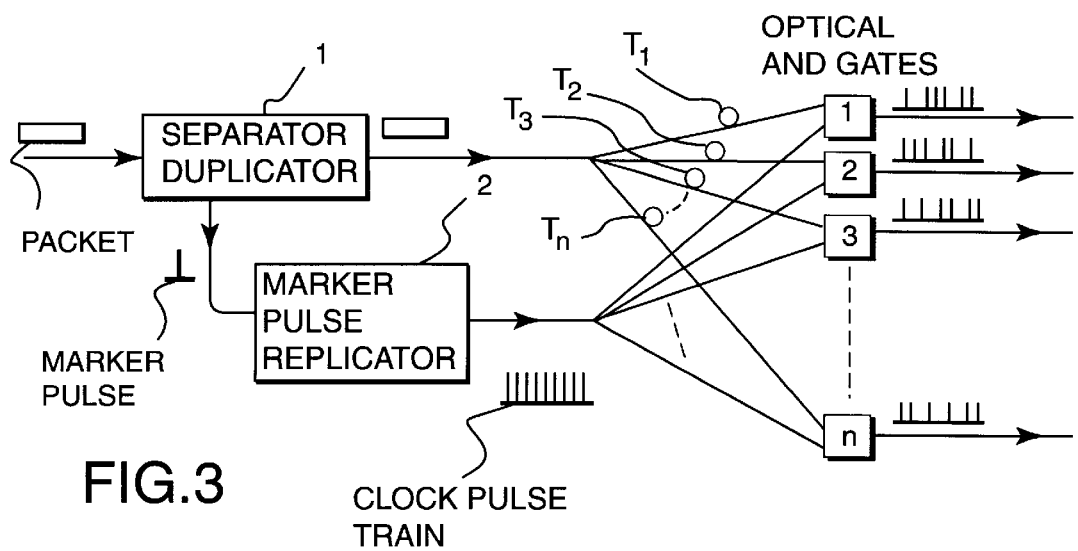
FIG. 3 is a packet demultiplexer.

FIG. 3 shows a third example of a system embodying the present invention. The circuit shown is an all-optical packet demultiplexer. Data contained in an incoming high-speed data packet is demultiplexed to create several lower bit rate channels that can then be accessed using conventional opto-electronic receivers and electronic processing systems. The demultiplexer as a whole functions in effect as a series-to-parallel converter.

As in the previously described embodiments, the incoming packet passes through a marker pulse separator/duplicator which outputs a marker pulse which is replicated to produce a clock pulse train at the packet bit rate or at the packet bit rate divided by M, where M=1,2,3,4 . . . . The original packet passes on from the marker pulse separator/duplicator to branches which split the packet m ways where m is the number of demultiplexed output channels. Each of the branches has associated with it a different respective delay T1, T2 . . . Tm. Each branch is connected to a respective optical AND gate A1, A2 . . . Am. The second input to each optical AND gate is provided by a respective branch carrying the clock pulse train output from the marker pulse replicator.

The delays T1, T2 . . . Tm in each branch carrying the original data packet are chosen so that the packet data and clock pulses arrive at the AND gate in the following sequence: the clock pulses arrive at the first AND gate in synchronism with packet bits 1, m+1, 2m+1 . . . ; the clock pulses arrive at the second AND gate in synchronism with the packet bits 2, m+2, 2m+2; and so on. Each of the outputs from the AND gate is therefore at 1/m of the bit rate of the original packet.

The AND gate may be SLAs using four wave mixing (FwM) as described and claimed in our co-pending European application No. 94307188.6, filed 30th Sep. 1994.

The demultiplexing scheme used in this circuit is similar to one proposed by Forghieri et al [15], but differs in the way in which the local clock is derived. In [15] Forghieri et al do not describe how the local clock would be generated, but in a later paper [7] proposed the use of a transmitted clock pulse comb together with the packet, a technique which, as discussed in the introduction above, suffers serious disadvantages.

Figure 7:
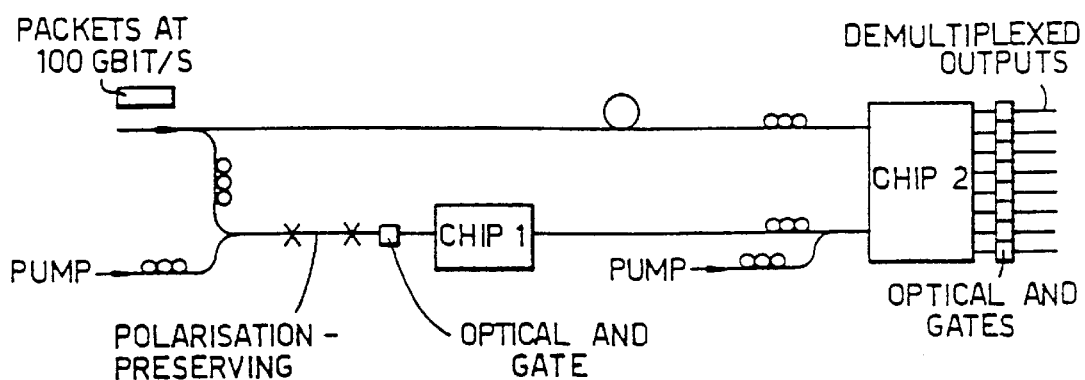
FIG. 7 is a schematic showing the layout of a demultiplexer.
Figure 8:
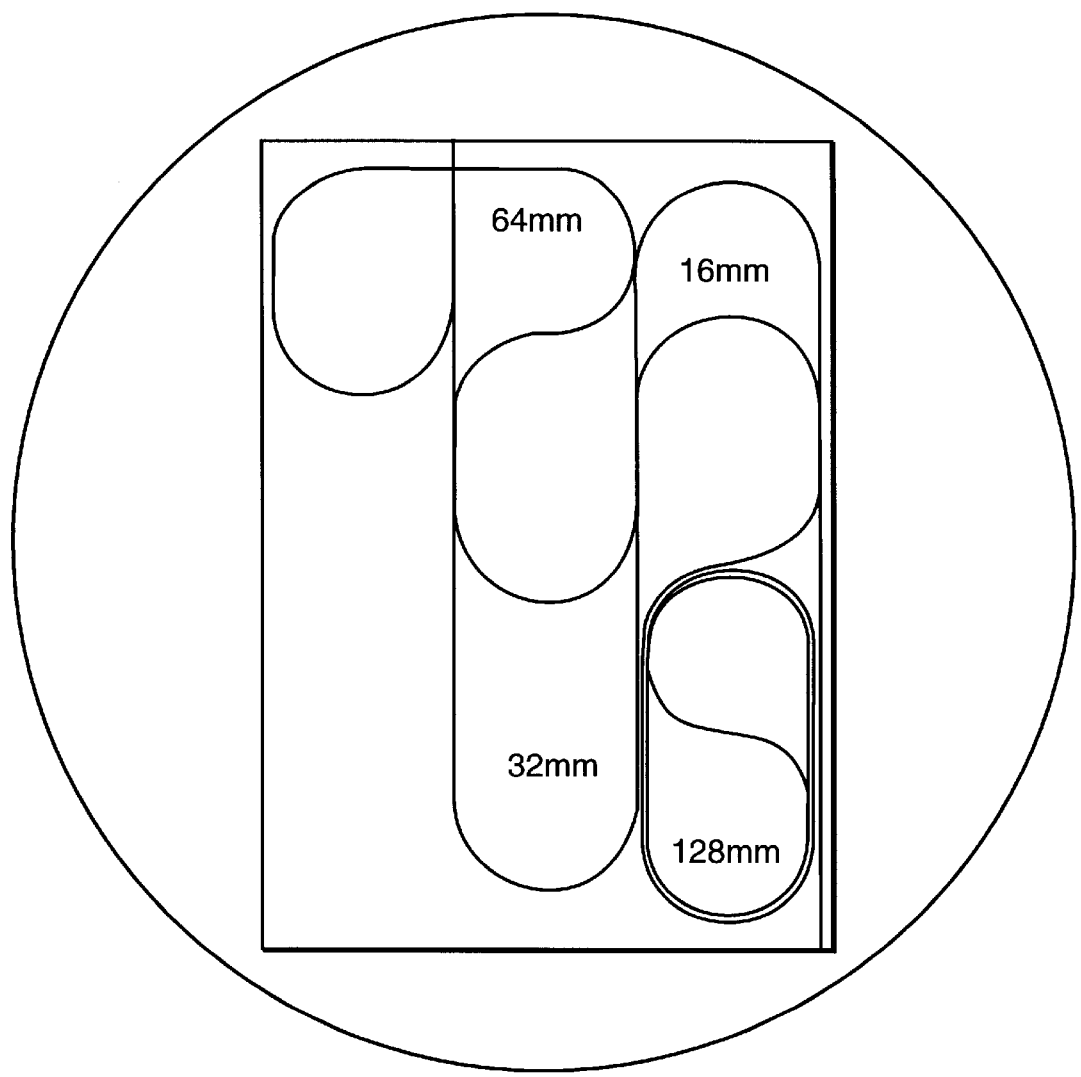
FIG. 8 shows the layout of the delay line chip 1 of FIG. 7.
Figure 9:
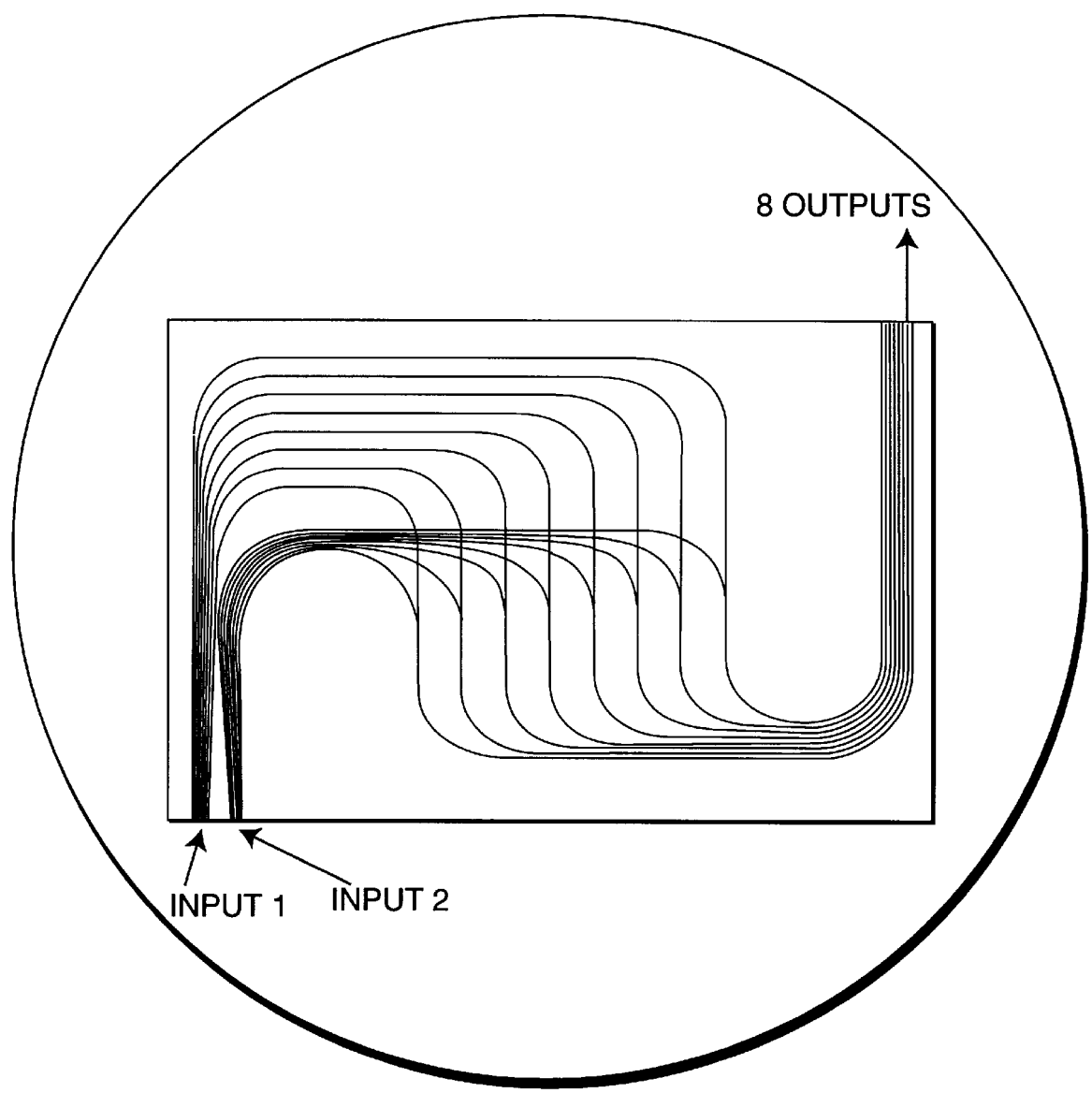
FIG. 9 shows the layout of delay line chip 2 of FIG. 7.

FIG. 7 shows the layout of an implementation of the circuit of FIG. 3 capable of demultiplexing 100 Gbit/s optical packets. In this circuit the marker pulse separation stage uses a length of polarisation preserving fibre connected to an optical AND gate as described above with reference to FIG. 5b. The pulse is then replicated in a silica planar delay line chip CHIP 1. This uses the topology shown in FIG. 6b, with four stages giving m=16. It outputs in response to each marker pulse a train of 16 pulses with a pulse spacing of 80 ps. The layout of the delay line for CHIP 1 is shown in FIG. 8. The FIGS. 16 mm etc denote the optical path differences in mm for each of the stages.

The pulse train output by CHIP 1 is then input together with an optical pump to input 2 of CHIP 2. The optical packet is received at input 1 of CHIP 2. These two inputs are polarised linearly in orthogonal directions, one in the plane of the device and the other at right angles. The desired polarisation may be produced by appropriate setting of a fibre polarisation controller in each path. Investigations by the present inventors have shown that silica planar delay line waveguides are polarisation preserving with the polarisation axis perpendicular to the plane of the device and with a birefingence beat length similar to a typical value for polarisation-preserving (high birefringence) optical fibre. Therefore the polarisation states of the input signals in CHIP 2 are preserved during propagation to the outputs, where 8 semiconductor optical amplifiers acting as the active devices for optical AND gates are situated. Each of the two inputs at CHIP 2 is split into 8 separate waveguides and then recombined in pairs using a topology corresponding to that shown schematically in FIG. 3. The first input 1 guide is combined with the first input 2 guide and so on. The chip design is such that the relative time delays between the packet and clock increase in steps of 10 ps from 0 to 70 ps. Therefore, the output from the first AND gate reproduces the packet bits 1, 9, 17, the second AND gate output reproduces bits 2, 10, 18 ..., and so on. The down-converted (demultiplexed) bit rate is therefore 100/8=12.5 Gbit/s, which is within the operating range of available photodetectors such as BT&D type PDC4310 PIN photodiodes.

Methods and devices embodying the present invention may advantageously be used in combination with the hybrid timing scheme described and claimed in our earlier copending European application filed 18th Nov. 1994 entitled "Optical Telecommunications Network" (Agent's ref: 80/4847/02), the contents of which are incorporated herein by reference. The hybrid timing scheme uses both a global packet-level clock and a local bit-level clock of higher precision. The marker-bit replicating technique of the present invention may be used to produce the local bit-level clock.

Rather than replicating the marker pulse to produce a regular clock pulse, the marker pulse may be used to produce an arbitrary word. For example, in a synchronous OTDM system, the marker pulse may be fed into a word forming network to produce an arbitrary word with pulses in bit positions corresponding to desired channels, and that word then used to retime/regenerate and/or demultiplex the selected channels using circuits as described above. An appropriate word-forming network is described in WO 94/21088 (PCT/GB 94/00397). FIG. 12 shows such a circuit in which 3' is the word-forming network.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

REFERENCES

[1] A D Ellis, T Widdowson, X Shan, G e Wickens and D M Spirit, Electron Lett 29, 990–992 (1993)
[2] S P Dijaili, J S Smith and A Dienes, Appl. Phys. Lett. 55 418–420 (1989)
[3] S Kawanishi and M Saruwatari, Electron Lett 28, 510–512 (1992)
[4] K Smith and J K Lucek, Electron Lett 28, 1814–1816 (1992)
[5] O Kamatani, S. Kawanishi and M Sarawutari, Electron lett 30, 807–809 (1994)
[6] T Saito, Y Yano and N Henmi, OFC'94 Technical Digest. (Optical Society of America, 1994), paper TuN3
[7] A Bononi, F Forghieri and P R Prucnal, Electron Lett. 29, 872–973 (1993)
[8] J P Gordon and H A Haus, Opt. Lett. 11 665–667 (1986)
[9] E M Dianov, A V Luchnikow, a N Pilipetskii and A M Prokorov, Sov. Lightwave Commun. 1, 37–43 (1991)
[11] K Smith and J K Lucek, Opt. Lett. 18 1226–1228 (1993)
[12] N J Doran and D Wood, Opt. Lett. 13, 56–58 (1988)
[13] J D Moores, K. Bergman, H A Haus and E P Ippen, Opt Lett 16, 138–140 (1991)
[14] M Eiselt, Electron Lett. 28, 1505 (1992)
[15] F Forghieri, A Bononi and P R Prucnal, Electron Lett 28 2289–2291 (1993)
[16] D Nesset, M C Tatham, L D Westbrook and D Cotter, to appear in Proceedings of Photonics in Switching, Florence, Italy, September 1994, and BT IPD Case A24802
[17] K K Goel, P R Prucnal, Y Shimazu, M Milbrodt, E Desurvire and B Tell, Electron Lett. 26, 287–289 (1989)
[18] M Eiselt, W Pieper and H G Weber, in OFC/IOOC'93 Technical Digest (Optical Society of America, 1993), paper Th14
[19] C J Beaumont, S A Cassidy, D Wellbourn, M Nield, A Thurlow and D M Spirit, B T Technol. J9, 30–35 (1991).

We claim:

1. A method of processing a multi-bit optical signal packet carried on an optical network, comprising the steps of:
   transmitting a marker pulse with said packet
   replicating in the optical domain the marker pulse: and
   producing a clock signal based on the replicated marker pulse at the bit-rate of said packet or a sub-multiple thereof for use in an operation on the packet.

2. The method according to claim 1, further comprising the step of:
   retiming the multi-bit packet using said signal.

3. The method according to claim 2, wherein said step of retiming comprises:
   introducing the packet and the clock signal into a non-linear optical modulator;
   cross-phase modulating the packet and the clock signal in the non-linear optical modulator; and
   outputting the packet onto a dispersive medium.

4. The method according to claim 1, further comprising the step of:
   regenerating said packet based on said clock signal.

5. The method according to claim 4, wherein the step of regenerating the packet comprises:
   imputting the clock signal to an optical switch, the optical switch being gated by the multi-bit packet, to produce a regenerated data stream at an output of said switch.

6. The method according to claim 5, wherein the optical switch comprises a non-linear loop mirror.

7. The method according to claim 1, further comprising the step of:
   regenerating the marker pulse, wherein the marker pulse from the packet is amplified or filtered or shaped prior to replication.

8. The method according to claim 1, wherein the marker pulse is distinguished from other pulses of the packet by a fixed time-relationship to said other pulses.

9. The method according to claim 8, wherein the marker pulse has a bit-asynchronous time relationship to the other pulses of the packet.

10. The method according to claim 9, further comprising the step of:
    separating the marker pulse from the packet by ANDing a packet header containing the marker pulse with a delayed version of the packet header, the delay being such that the marker pulse coincides at the AND gate with another pulse of the header.

11. The method according to claim 1, further comprising the step of:
    using the clock signal to clock a demultiplexer.

12. The method according to claim 11, wherein the step of clocking a demultiplexer comprises ANDing the clock signal with a plurality of copies of the packet having respective delays differing by integer numbers of bit periods.

13. An optical circuit for processing a multi-bit packet carried on an optical network, comprising:

an optical signal input a replicator optical circuit connected to receive optical signals from said input and arranged in the optical domain to generate at an optical signal output a clock signal, at a bit-rate of the packet or a sub-multiple thereof, from a marker pulse carried with the multi-bit packet, and an optical signal processing circuit connected to said output and arranged to use said clock signal in a subsequent operation on the packet.

14. The optical circuit of claim 13, wherein said replicator circuit comprises a single stage split, delay and recombine network.

15. The optical circuit of claim 14, wherein said replicator circuit further comprises an amplified optical recirculating loop.

16. The optical circuit of claim 13, wherein said replicator circuit comprises plural split, delay and combine stages connected in series.

17. The optical circuit of claim 16, wherein said replicator circuit further comprises an amplified optical recirculating loop.

18. The optical circuit of claim 13, wherein said replicator circuit comprises an amplified optical recirculating loop.

19. An optical packet retiming device comprising:

an optical signal input, a replicator optical circuit connected to receive optical signals from said input and arranged in the optical domain to generate a clock signal, at a bit-rate of the packet or a sub-multiple thereof, from a marker pulse carried with the multi-bit packet, and an optical signal processing circuit connected to said output and arranged to use said clock signal being used in a subsequent operation on the packet.

20. An optical packet regenerator, comprising:

an optical signal input, a replicator optical circuit connected to receive optical signals from said input and arranged in the optical domain to generate a clock signal, at a bit-rate of the packet or a sub-multiple thereof, from a marker pulse carried with the multi-bit packet, and an optical signal processing circuit connected to said output and arranged to use said clock signal being used in a subsequent operation on the packet.

21. An optical packet demultiplexer, comprising:

an optical signal input, a replicator optical circuit connected to receive optical signals from said input and arranged in the optical domain to generate a clock signal, at a bit-rate of the packet or a sub-multiple thereof, from a marker pulse carried with the multi-bit packet, and an optical signal processing circuit connected to said output and arranged to use said clock signal being used in a subsequent operation on the packet.

22. A method of processing a multi-bit optical signal packet carried on an optical network comprising the steps of:

transmitting a marker optical pulse with the packet;

generating in the optical domain an optical word from the marker optical pulse carried with the packet;

processing the packet with the optical word; and outputting the processed packet.

23. The method according to claim 22, wherein the step of processing the packet comprises, gating the packet by the optical word in an optical switch.

24. The method according to claim 22, wherein the step of processing the packet comprises demultiplexing selected channels of the packet.

25. The method according to claim 22, wherein the marker pulse is distinguished from other pulses of the packet by a fixed time-relationship to said other pulses.

26. The method according to claim 25, wherein the marker pulse has a bit-asynchronous time relationship to the other pulses of the packet.

27. The method according to claim 22, wherein the packet is a synchronous OTDM (Optical Time-Division-Multiplexed) frame, and the optical word formed from the marker pulse comprises pulses in bit positions corresponding to selected channels of the OTDM frame.

28. An optical circuit for processing a multi-bit optical signal packet carried on an optical network, comprising:

a separator arranged in the optical domain to separate a marker optical pulse from the packet;

a word-forming optical network operatively connected to said separator, said word-forming network arranged to form an optical word from the marker pulse; and a processor in the optical domain for receiving said optical word and said packet, said processor optically processing the packet with the optical word.

29. A method for sending and receiving a self-clocking multi-bit optical pulse packet on an optical network, said method comprising the steps of:

at an optical transmitter site, sending at least one uniquely distinguishable optical marker pulse with a multi-bit optical data pulse packet; and at an optical receiver site, optically replicating each said optical marker pulse into plural clock pulses aligned in time with expected occurrences of optical data pulses.

* * * * *